C. LÉPINE.
APPARATUS FOR DIRECT VISION OR FOR PROJECTION OF SEPARATE TRANSPARENT PHOTOGRAPHIC VIEWS UPON FILMS OR THE LIKE.
APPLICATION FILED MAR. 30, 1922.

1,437,112.

Patented Nov. 28, 1922.

Patented Nov. 28, 1922.

1,437,112

UNITED STATES PATENT OFFICE.

CHARLES LÉPINE, OF TURIN, ITALY, ASSIGNOR TO HAZARD DE RUYTER, OF PARIS, FRANCE.

APPARATUS FOR DIRECT VISION OR FOR PROJECTION OF SEPARATE TRANSPARENT PHOTOGRAPHIC VIEWS UPON FILMS OR THE LIKE.

Application filed March 30, 1922. Serial No. 548,106.

*To all whom it may concern:*

Be it known that I, CHARLES LÉPINE, a citizen of the French Republic, and a resident of 91 Corso Casale, Turin, Italy, have invented new and useful Improvements in an Apparatus for Direct Vision or for Projection of Separate Transparent Photographic Views upon Films or the like, of which the following is a specification.

The present invention relates to an apparatus for direct vision or for the projection of separate transparent photographic views such as the separate views of a cinematograph film or photographic views on sensitized film or upon paper, or the like.

This apparatus consists of a hollow drum which is provided upon its periphery with apertured cells diametrically opposed, and is mounted in such a manner as to be able to turn with slight friction, within a cylindrical box furnished with two diametrically opposite magazines, one of which contains a certain number of these separate transparent photographic views piled or stacked one upon another, and the other of which magazines is intended to receive those views after vision or projection; this box is also provided with two windows, diametrically opposite, of which one serves for the lighting of the views or transparencies and the other encloses or supports a lens for the direct vision or the projection of these views, so that by communicating from the exterior an intermittent movement of rotation to the drum, the views fall one by one from the feed-magazine into the apertured cells formed in the periphery of the drum, are carried along thereby and pass in front of the windows of the box through which they are inspected or projected, and finally fall in succession into the receiver-magazine. The apparatus is invertible, that is to say when all the views have fallen from the feed-magazine into the receiver-magazine, the apparatus can be inverted, the receiver becoming the feed magazine and vice versa.

The views are preferably furnished with a metallic frame, arched to the curve of the periphery of the drum, intended to receive and to carry along the views in the course of its rotary movement. This frame may be composed, for instance, of edgings of thin sheet metal mounted on two opposite sides of the photographic view, or of an apertured metal framework or shield.

In order to press, against the peripheral wall of the carrier-drum, the separate views stacked in the feed magazine and thus to facilitate their fall and their proper placing in the cells of this drum, a weight in the form of a plate, suitably guided, can slide freely within this magazine; a similar weight arranged within the receiving magazine is connected to the former in such a manner as to follow it in its descending movement proportionately as the views fall from the feed magazine on to the carrier-drum; the weight placed in the magazine which receives the views prevents them from falling abruptly to the bottom of this magazine and thus prevents them from being upset or assuming a wrong position, by which they might impede the proper working of the apparatus.

One form of carrying out the apparatus according to the invention is shown by way of example upon the annexed sheet of drawings, in which.

Figure 1:
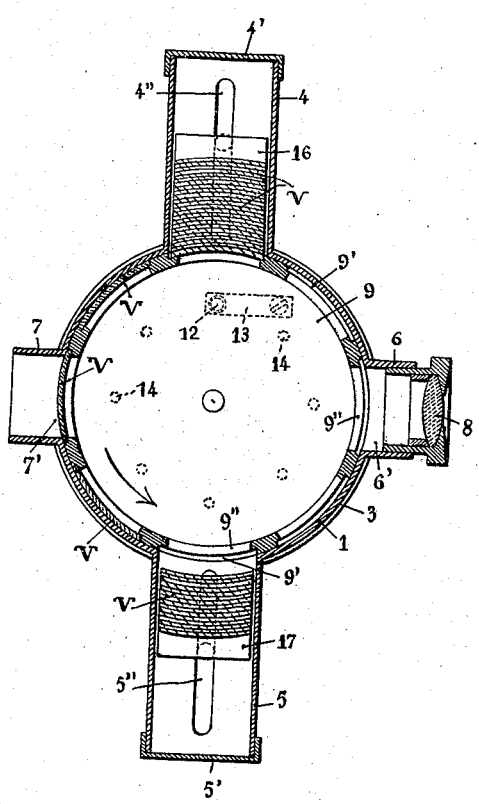
Figures 1 and 2 are sectional views, longitudinal and transverse respectively, at right angles one to the other.
Figure 2:
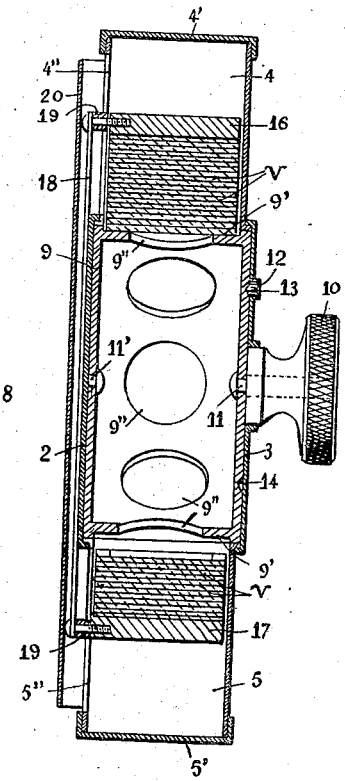

The apparatus comprises a cylindrical box 1 closed by a base 2 and a removable lid 3. Upon this box are mounted two magazines 4 and 5 of rectangular section, diametrically opposite, leading to the interior of the box 1 and intended to receive the transparencies or views on positive film or on paper; these magazines are each closed by a removable lid 4'—5' respectively. The box is also formed with two windows 6' and 7' diametrically opposite to one another, situated preferably upon a diameter perpendicular to that along which the magazines 4 and 5 are arranged; the cylindrical box 1 is extended around these windows 6' 7' by sleeves 6—7. An eye-piece provided with a lens 8 is mounted telescopically in such a manner as to be able to slide axially in one of the sleeves 6—7. Within the box 1 is mounted with light friction a hollow drum 9 to which can be imparted by means of a knob 10, fixed to the centre of one of the side plates, a rotatory movement around its axis 11—11'. This drum 9 is fitted in its peripheral wall, with cells or sunk portions 9' of dimensions substantially equal to the cross section of the magazines 4—5. These cells, diametrically opposed two and two, are evenly spaced around the drum; in the example illustrated, these cells number eight but they may be of any other number. The bottom of each cell is apertured, that is to say the peripheral wall of the drum 9 is cut away, at or opposite each cell 9', with a circular window 9'' having a diameter substantially equal to that of the windows 6' and 7' corresponding with the sleeves 6—7. A throat is thus formed at the base of the cell which will allow light to pass therethrough but will prevent the framed film or transparency from falling into the interior of the drum.

The drum 9 is locked at each one-eighth of a turn by a stud 12, carried by a plate spring 13 fixed to the lid 3 of the box 1 and passing through a hole formed in this lid. This stud 12 engages at each one-eighth of a turn movement communicated by the knob 10 to the drum, into one of the eight notches or recesses 14 arranged in a circle and equally spaced in the end wall of the drum.

Figure 3:
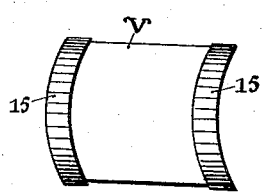
Figures 3 and 4 show in perspective two methods of mounting the views on film in their metallic frames.
Figure 4:
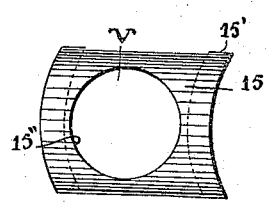

The transparent photographic views upon film, paper or the like are preferably furnished with a metallic frame intended to give them the necessary thickness and rigidity as well as a profile curved to a radius substantially equal to that of the drum 9. For this purpose, each view transparency $v$ can be fitted (Fig. 3) upon two opposite edges with fitments 15 of thin sheet metal, each formed of a plate curved to U shape and between which the view or transparency $v$ is gripped and held. These metal fitments 15 are preferably curved to a suitable radius in such a way as to give to the view or transparency the desired curvature. In the modification shown in Fig. 4, the metal fitment takes the shape of a frame of sheet metal, having the desired curvature and provided on two opposite edges with flanges 15' between which the film view is held, which view appears through the central aperture 15'' of the frame. With this arrangement of frame, the film view $v$ can be mounted in a removable manner in the rigid frame 15, by causing it to slide within the flanges 15'.

Inside the magazine 4 at the upper part of the apparatus, I arrange a series of these views fitted with their metal framing and stacked one upon another; their introduction into place can be effected from the interior of the box 1 after the drum 9 has been withdrawn and the removable lid 3 has been taken off.

Inside each magazine is arranged a weight of the shape of a plate, shown at 16 in the upper magazine and 17 in the lower magazine. The two weights 16, 17 are preferably coupled together by a rod 18 arranged exteriorly of the magazines and connected to the weights 16 and 17 by gudgeons 19, 19 passing through slots or windows 4'', 5'' formed in the corresponding walls of the magazines 4, 5. The coupling rod 18 is preferably shielded by a protecting metal cover 20.

The working of the apparatus is as follows: The drum 9 is intermittently rotated from the exterior by the knob 10, each movement being one-eighth of a turn, in the direction of the arrow (Fig. 1); the then lowermost view $v$ of the series piled in the magazine 4, falls into each empty cell 9' in the periphery of the drum 9 which presents itself below the magazine; each view is then carried in front of the window 7' and the sleeve 7, where it can be directly inspected through the lens 8 in the other sleeve 6 used as an eye-piece, focusing being effected by the axial displacement of, i. e., sliding, the lens 8 in its sleeve 6. The view can also be projected by illuminating it in a sufficient manner through the sleeve 7 and utilizing the lens 8 or any other optical device as the projector.

By continuing the movement of rotation of the drum, the views already inspected or projected pass opposite the lower magazine 5 into which they fall in succession by gravity, but in a reversed position.

All the views contained in the upper magazine 4 are thus collected eventually in the lower magazine 5. They can be again inspected or projected, but in the opposite order, by inverting the apparatus; the magazine 5 then becomes the feed magazine and the magazine 4, the receiver. The lens 8 from the sleeve 6 is also placed in the sleeve 7 which thereupon serves as the eye-piece.

The coupling rod 18 may be of such a length that when the weight 16 is at the top of the magazine 4, the corresponding weight 17 is also at the upper part of the magazine 8. In this manner the views or transparencies falling from the drum 9 into the magazine 5 have only to pass through a comparatively small space or trajectory and there is no risk during this short fall of their being inclined or being turned or assuming a defective position, which would affect or impede the proper working of the apparatus.

It is to be understood that without departing from the spirit of the invention, a large number of detail modifications may be made in the example described and illustrated; thus the construction of the drum can be modified by giving to its periphery a polygonal shape, the plane cells then receiving plane transparencies or views. Also, the construction of the metal fitments of the views, the arrangement of the weights or plates for guiding the views in the magazines might be varied.

There may be used, for example, in the apparatus forming the subject of this invention, portions of positive cinematograph film no longer useful for cinema projection, these film-lengths being suitably cut off to afford the more interesting views or those in the best condition.

What I claim is:

1. An apparatus for the direct vision or for the projection of separate, transparent, photographic views upon film, paper or the like, comprising a cylindrical box, provided with two diametrically opposed magazines, one of which contains a number of the said separate transparent photographic views, stacked one above the other and the other of which magazines is intended to receive the views after inspection or projection, a hollow drum rotatably mounted in said cylindrical box, apertured cells provided on the periphery of said drum and diametrically opposed two and two, two diametrically opposed windows in the cylindrical box, of which one serves for the lighting of the views and the other contains a lens for the direct vision or the projection of the views, means for communicating to the drum from the exterior an intermittent movement of rotation, so that the views fall one by one from the feed magazine into the apertured cells upon the periphery of the drum, are carried on by the drum and pass before the windows of the box, through which they are inspected or projected, and fall in succession into the receiving magazine.

2. An apparatus for the direct vision or for the projection of separate, transparent, photographic views upon film, paper or the like, comprising a cylindrical box, provided with two diametrically opposed magazines, one of which contains a number of the said separate transparent photographic views, stacked one above the other and the other of which magazines is intended to receive the views after inspection or projection, a hollow drum rotatably mounted in said cylindrical box, apertured cells provided on the periphery of said drum and diametrically opposed two and two, two diametrically opposed windows in the cylindrical box, of which one serves for the lighting of the views and the other contains a lens for the direct vision or the projection of the views, means for communicating to the drum from the exterior an intermittent movement of rotation, so that the views fall one by one from the feed magazine into the apertured cells upon the periphery of the drum, are carried on by the drum and pass before the windows of the box, through which they are inspected or projected, and fall in succession into the receiving magazine, in combination with means for pressing the views stacked in the feed magazine against the periphery of the drum, so as to facilitate their fall and their introduction into the cells of the drum.

3. An apparatus for the direct vision or for the projection of separate, transparent, photographic views upon film, paper or the like, comprising a cylindrical box, provided with two diametrically opposed magazines, one of which contains a number of the said separate transparent photographic views, stacked one above the other and the other of which magazines is intended to receive the views after inspection or projection, a hollow drum rotatably mounted in said cylindrical box, apertured cells provided on the periphery of said drum and diametrically opposed two and two, two diametrically opposed windows in the cylindrical box, of which one serves for the lighting of the views and the other contains a lens for the direct vision or the projection of the views, means for communicating to the drum from the exterior an intermittent movement of rotation, so that the views fall one by one from the feed magazine into the apertured cells upon the periphery of the drum, are carried on by the drum and pass before the windows of the box, through which they are inspected or projected, and fall in succession into the receiving magazine, in combination with a weight, having the form of a slidable plate, resting upon the views in the feed magazine so as to press the said views against the periphery of the drum, and to facilitate their fall and their introduction into the cells of the drum.

4. An apparatus for the direct vision or for the projection of separate, transparent, photographic views upon film, paper or the like, comprising a cylindrical box, provided with two diametrically opposed magazines, one of which contains a number of the said separate transparent photographic views, stacked one above the other and the other of which magazines is intended to receive the views after inspection or projection, a hollow drum rotatably mounted in said cylindrical box, apertured cells provided on the periphery of said drum and diametrically opposed two and two, two diametrically opposed windows in the cylindrical box, of which one serves for the lighting of the views and the other contains a lens for the direct vision or the projection of the views, means for communicating to the drum from the exterior an intermittent movement of rotation, so that the views fall one by one from the feed magazine into the apertured cells upon the periphery of the drum, are carried on by the drum and pass before the windows of the box, through which they are inspected or projected, and fall in succession into the receiving magazine, in combination with a weight, having the form of a slidable plate, in each of the magazines of the box, rod means connecting said both plates, the plate in the upper or feed magazine pressing the views against the periphery of the drum, and the plate in the lower or receiving magazine supporting the views left one by one by the rotating drum on its passage above said collecting magazine.

5. In an apparatus as claimed in claim 1, the mounting of each of the separate views in a metal fitment having a shape and dimensions corresponding with those of the cells in the drum.

6. In an apparatus as claimed in claim 1, the mounting of each of the separate views in a metal fitment, composed of metal strips curved into U shape, and mounted upon the edge of two opposite sides of the view, these metal strips having, and imparting to the view a curvature corresponding to that of the peripheral wall of the carrier drum.

7. In an apparatus as claimed in claim 1, the mounting of each of the separate views in an apertured frame of sheet metal, of a curvature corresponding to that of the carrier drum and of a shape and dimensions corresponding with those of the cells of said drum, said metal frame comprising two parallel side flanges, folded in U shape, between which the view is gripped in a removable manner.

In testimony whereof I have signed my name to this specification.

CHARLES LÉPINE.

Witnesses:
HENRIETTA DELFORNO,
UMBERT FRANCISIUM.